United States Patent
Kato et al.

(10) Patent No.: US 6,588,275 B2
(45) Date of Patent: Jul. 8, 2003

(54) VIBRATING GYROSCOPE

(75) Inventors: Yoshitaka Kato, Sagamihara (JP); Kaneo Yaji, Sagamihara (JP); Tomoyasu Hasegawa, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 24 days.

(21) Appl. No.: 09/935,899

(22) Filed: Aug. 23, 2001

(65) Prior Publication Data

US 2002/0078747 A1 Jun. 27, 2002

(30) Foreign Application Priority Data

Aug. 23, 2000 (JP) ........................................ 2000-252537

(51) Int. Cl.[7] ............................................... G01C 19/00
(52) U.S. Cl. ................................................... 73/504.12
(58) Field of Search ......................... 73/504.12, 504.02, 73/504.03, 504.04

(56) References Cited

U.S. PATENT DOCUMENTS 4,765,046 A    8/1988  Partington et al.
5,952,572 A  * 9/1999  Yamashita et al. ........ 73/504.04

FOREIGN PATENT DOCUMENTS

| EP | 0175508 | 3/1986 |
| EP | 0809087 | 11/1997 |
| EP | 0821481 | 1/1998 |
| JP | 10-153430 | 9/1998 |
| JP | 10-300475 | 11/1998 |

* cited by examiner

*Primary Examiner*—Richard A. Moller
(74) *Attorney, Agent, or Firm*—Keating & Bennett, LLP

(57) ABSTRACT

A vibrating sensor device is disposed on the obverse or reverse surface of a substrate. A signal processing circuit is disposed on the other surface of the substrate. First and second detecting wiring patterns, through which detection signals generated based on a vibration of a vibrator of the vibrating sensor device caused by a Coriolis force pass, extend from the vibrating sensor device in opposite directions. First and second driving wiring patterns for respectively allowing first and second driving signals, which are 180 degrees out of phase with each other, to pass therethrough extend from the vibrating sensor device in opposite directions. The above-described wiring patterns are disposed so that the capacitances between the adjacent wiring patterns become substantially equal to each other.

7 Claims, 7 Drawing Sheets

VIBRATING GYROSCOPE

BACKGROUND OF THE INVENTION

1. Field of the Invention

The present invention relates to a vibrating gyroscope used as, for example, a position detecting sensor.

2. Description of the Related Art

FIG. 7 is a top view schematically illustrating an example of a conventional vibrating gyroscope, disclosed in the Unexamined Japanese Patent Application Publication No. 10-300475. A vibrating gyroscope 1 is formed of a substrate 30, a vibrating sensor device 31, a signal processing circuit 32, a first driving wiring pattern 33a, a second driving wiring pattern 33b, a first detecting wiring pattern 34a, a second detecting wiring pattern 34b, a compensation wiring pattern 35, and wiring patterns (36a, 36b, 36c, and 36d).

The vibrating sensor device 31 and the signal processing circuit 32 are disposed in the same plane of the substrate 30, and are connected to each other by the first and second driving wiring patterns 33a and 33b, the first and second detecting wiring patterns 34a and 34b, and the wiring patterns 36.

The vibrating sensor device 31 is configured, such as that shown in FIG. 4. The vibrating sensor device 31 shown in FIG. 4 has a device substrate 3, on which a supporting stationary portion 4, comb-like driving stationary electrodes 5 (5a, 5b, 5c, 5d, 5e, 5f, 5g, and 5h), and detecting stationary electrodes 6 (6a, 6b, 6c, 6d, 6e, and 6f) are disposed. A vibrator 8 is connected to the supporting stationary portion 4 via support portions (7a and 7b).

The vibrator 8 is disposed away from the device substrate 3, and is formed of driving beams 9 (9a, 9b, 9c, and 9d), an outer frame 10, comb-like driving movable electrodes 11 (11a, 11b, 11c, 11d, 11e, 11f, 11g, and 11h), support portions 12a and 12b, detecting beams 13 (13a, 13b, 13c, and 13d), an inner frame 14, and comb-like detecting movable electrodes 15 (15a, 15b, 15c, 15d, and 15f).

One end of each of the driving beams 9a and 9b is connected to the support portion 7a, and one end of each of the driving beams 9c and 9d is connected to the support portion 7b. The other ends of the driving beams 9a, 9b, 9c, and 9d are connected to the outer frame 10.

The outer frame 10 can vibrate in the X direction shown in FIG. 4. This is discussed in detail below. In the outer frame 10, the comb-like driving movable electrodes 11 are meshed with the corresponding comb-like driving stationary electrodes 5 such that they are away from each other with a predetermined space. The comb-like driving stationary electrodes 5a, 5b, 5c, and 5d and the comb-like driving movable electrodes 11a, 11b, 11c, and 11d form a first driving unit. The comb-like driving stationary electrodes 5e, 5f, 5g, and 5h and the comb-like driving movable electrodes 11e, 11f, 11g, and 11h form a second driving unit.

The first driving unit is electrically connected to the first driving wiring pattern 33a or the second driving wiring pattern 33b (for example, the first driving wiring pattern 33a) shown in FIG. 7 via an electrode pad (not shown) or wiring (not shown). The second driving unit is electrically connected to the first driving wiring pattern 33a or the second driving wiring pattern 33b (for example, the second driving wiring pattern 33b) via an electrode pad (not shown) or wiring (not shown).

The support portions 12a and 12b extend inward away from the outer frame 10. The detecting beams 13a and 13b extend from the forward-facing end of the support portion 12a, while the detecting beams 13c and 13d extend from the forward-facing end of the support portion 12b.

The inner frame 14 is connected to the forward-facing ends of the detecting beams 13a, 13b, 13c, and 13d. The inner frame 14 can vibrate integrally with the outer frame 10 in the X direction. The inner frame 14 can also vibrate in the Y direction relative to the outer frame 10. The vibration of the inner frame 14 is discussed below. In the inner frame 14, the comb-like detecting movable electrodes 15 are meshed with the corresponding comb-like detecting stationary electrodes 6 such that they are away from each other with a predetermined space. The comb-like detecting stationary electrodes 6a, 6b, and 6c and the comb-like detecting movable electrodes 15a, 15b, and 15c form a first detecting unit. The comb-like detecting stationary electrodes 6d, 6e, and 6f and the comb-like detecting movable electrodes 15d, 15e, and 15f form a second detecting unit.

The first detecting unit is electrically connected to the first detecting wiring pattern 34a or the second detecting wiring pattern 34b (for example, the first detecting wiring pattern 34a) shown in FIG. 7 via an electrode pad (not shown) or wiring (not shown). The second detecting unit is electrically connected to the first detecting wiring pattern 34a or the second detecting wiring pattern 34b (for example, the second detecting wiring pattern 34b) via an electrode pad (not shown) or wiring (not shown).

In the vibrating sensor device 31 constructed as described above and as shown in FIG. 4, a first driving signal and a second driving signal, which are 180 degrees out of phase with each other, are applied to both the first driving unit and the second driving unit, which are formed by the driving stationary electrodes 5 and the driving movable electrodes 11, via the first driving wiring pattern 33a and the second driving wiring pattern 33b, respectively. Then, the magnitude of the capacitance is changed on the basis of the driving signals so that the overall vibrator 8 vibrates in the X direction shown in FIG. 4 by utilizing the rust elasticity of the driving beams 9 while being supported by the support portions 7a and 7b.

By rotating the overall vibrator 8 in the Z direction (perpendicular to the plane of FIG. 4) while it is vibrating in the X direction, a Coriolis force is generated orthogonal to the driving direction (X direction) of the vibrator 8 and the central-axis direction (Z direction) of the rotation of the vibrator 8, that is, in the Y direction. Because of this Coriolis force, the inner frame 14 of the vibrator 8 vibrates in the Y direction relative to the outer frame 10 by utilizing the elasticity of the detecting beams 13 while being supported by the support portions 12a and 12b.

By detecting a change in the capacitance between the detecting stationary electrodes 6 and the detecting movable electrodes 15 based on the vibration of the inner frame 14 in the Y direction, the magnitude of the angular velocity around the Z axis can be determined.

To avoid adverse influences, such as air damping, the above-configured vibrator 8 is generally housed and sealed in a space formed between, for example, a lid member, and the device substrate 3 while being decompressed. In this case, the driving stationary electrodes 5 and the detecting stationary electrodes 6 of the vibrating sensor device 31 are electrically connected to exterior components via through-holes provided in the lid member.

FIG. 5 illustrates an example of the signal processing circuit 32 to be connected to the vibrating sensor device 31. In FIG. 5, the essential portions of the vibrating sensor device 31 are also shown. The signal processing circuit 32 is formed of a first detecting C-V converter 21, a second detecting C-V converter 22, a first first-stage amplifying circuit 23a, a second first-stage amplifying circuit 23b, a summing amplifier 24, a differential amplifier 25, an auto gain control (AGC) unit 26, and a phase inverter 27. For simple representation of the signal processing circuit 32, the driving stationary electrodes 5, the detecting stationary electrodes 6, the vibrator 8, the driving movable electrodes 11, and the detecting movable electrodes 15 of the vibrating sensor device 31 are shown in a simplified form in FIG. 5.

The first detecting C-V converter 21 is connected to the first detecting unit of the vibrator sensor device 31 via, for example, the first detecting wiring pattern 34a. The first detecting C-V converter 21 then converts the total capacitance between the detecting stationary electrodes (6a, 6b, and 6c) and the detecting movable electrodes 15 (15a, 15b, and 15c) into a voltage, and outputs the resulting signal. The second detecting C-V converter 22 is connected to the second detecting unit of the vibrator sensor device 31 via, for example, the second detecting wiring pattern 34b. The second detecting C-V converter 22 then converts the total capacitance between the detecting stationary electrodes 6 (6d, 6e, and 6f) and the detecting movable electrodes 15 (15d, 15e, and 15f) into a voltage, and outputs the resulting signal.

It is now assumed that the vibrator 8 vibrates only in the X direction. In this case, the signal output from the first detecting C-V converter 21 has a waveform indicated by the one-dot-chain line A1 shown in (a) of FIG. 6. The signal output from the second detecting C-V converter 22 has a waveform indicated by the one-dot chain line A2 shown in (b) of FIG. 6. The signal A1 has the same amplitude as and is in phase with the signal A2. The signals A1 and A2 are 90 degrees out of phase with the above-described first and second driving signals for driving the vibrator 8.

It is now assumed that the inner frame 14 of the vibrator 8 vibrates not only in the X direction, but also in the Y direction (Coriolis force direction) because of a Coriolis force generated by the angular velocity about the Z axis shown in FIG. 4. In this case, the first detecting C-V converter 21 outputs a superimposed signal of the signal component A1 and a signal component B1 generated by the angular velocity (Coriolis force) and indicated by the solid line B1 shown in (a) of FIG. 6. The amplitude of the signal component B1 is determined by the magnitude of the angular velocity, and the signal component B is 90 degrees out of phase with the signal component A1.

The second detecting C-V converter 22 outputs a superimposed signal of the signal component A2 and a signal component B2 generated by a Coriolis force and indicated by the solid line B2 shown in (b) of FIG. 6. The amplitude of the signal component B2 is determined by the magnitude of the angular velocity, and the signal component B2 is 90 degrees out of phase with the signal component A2. In other words, the amplitude of the signal component B2 is substantially the same amplitude as that of the signal component B1. The signal component B2 is 180 degrees out of phase with the signal component B1.

As discussed above, the first and second detecting C-V converters 21 and 22 output the signals according to the vibration state of the vibrator 8 to the summing amplifier 24 and the differential amplifier 25 via the first and second first-stage amplifying circuits 23a and 23b.

The summing amplifier 24 sums the signals output from the first and second detecting C-V converters 21 and 22, and amplifies the resulting signal. As a result of the summing performed by the summing amplifier 24, the signal component B1 output from the first detecting C-V converter 21 and the signal component B2 output from the second detecting C-V converter 22 cancel each other, and are thus eliminated. Accordingly, only the addition signal of the signal components A1 and A2, i.e., the signal generated by only the vibration of the vibrator 8, is output from the summing amplifier 24 to the AGC unit 26 as a driving detection signal (monitor signal).

The AGC unit 26 outputs a driving signal based on the above-described driving detection signal by performing positive feedback control so that the vibrator 8 can stably vibrate at a resonant frequency in a preset driving direction. The driving signal is directly applied to (i) the first driving unit formed by the driving stationary electrodes 5 (5a, 5b, 5c, and 5d) and the driving movable electrodes 11 (11a, 11b, 11c, and 11d), or (ii) the second driving unit formed by the driving stationary electrodes 5 (5e, 5f, 5g, and 5h and the driving movable electrodes 11 (11e, 11f, 11g, and 11h) (to the second driving unit in the example shown in FIG. 5) as a second driving signal via the second driving wiring pattern 33b. Then, a signal obtained by inverting the phase of the above-mentioned second driving signal by using the phase inverter 27 is applied to the other driving unit (in this case, the first driving unit) as a first driving signal via the first driving wiring pattern 33a. The vibrator 8 vibrates as described above because of the application of the first and second driving signals. That is, based on the vibration state of the vibrator 8 in the driving direction (X direction) detected as described above, positive feedback control is performed on the first and second driving units, thereby stabilizing the vibration of the vibrator 8 in the driving direction.

The differential amplifier 25 amplifies a difference between the signal output from the first detecting C-V converter 21 and the signal from the second detecting C-V converter 22. As a result of the differential amplification performed by the differential amplifier 25, the signal component A1 output from the first detecting C-V converter 21 and the signal component A2 from the second detecting C-V converter 22 cancel each other, and are thus eliminated. Accordingly, the differential amplifier 25 outputs an addition signal of the signal components B1 and B2 as an angular velocity signal. The magnitude of the angular velocity around the Z axis can be detected on the basis of the angular velocity signal.

The wiring patterns 33a, 33b, 34a, and 34b for connecting the vibrating sensor device 31 to the signal processing circuit 32 are arranged side by side, as shown in FIG. 7. Thus, due to capacitances C1, C2, and C3 generated between the corresponding adjacent wiring patterns, noise components caused by the first and second driving signals respectively transmitted in the driving wiring patterns 33a and 33b are superimposed on the detection signals transmitted in the first and second detecting wirings patterns 34a and 34b.

As stated above, however, the first driving signal transmitted in the first driving wiring pattern 33a is 180 degrees out of phase with the second driving signal transmitted in the second driving wiring pattern 33b. Thus, by disposing the first driving wiring pattern 33a, the first detecting wiring pattern 34a, and the second driving wiring pattern 33b so that the capacitance C1 becomes substantially equal to the capacitance C2, the noise components caused by the first driving signal and the noise components by the second driving signal cancel each other in the detection signal transmitted in the first detecting wiring pattern 34a which is interposed between the first driving wiring pattern 33a and the second driving wiring pattern 33b. Thus, the detection signal contains very little noise caused by the driving signals.

In contrast, the second detecting wiring pattern 34b is greatly influenced by only the second driving signal transmitted in the second driving wiring pattern 33b. Accordingly, the noise components caused by the second driving signal are disadvantageously superimposed on the detection signal transmitted in the second detecting wiring pattern 34b. This results in inaccurate determination of the angular velocity. In order to avoid this problem, in the configuration son r FIG. 7, the compensation wiring pattern 35 to be electrically connected to the second detecting wiring pattern 34b is disposed adjacent to the first driving wiring pattern 33a. In this case, the compensation wiring pattern 35 is disposed so that capacitance Ch between the first driving wiring pattern 33a and the compensation wiring pattern 35 becomes substantially equal to the capacitance C3 between the second driving wiring pattern 33b and the second detecting wiring pattern 34b.

With this arrangement, signal components caused by the first driving signal transmitted in the first driving wiring pattern 33a are generated in the compensation wiring pattern 35, and cancel the noise components caused by the second driving signal transmitted in the second detecting wiring pattern 34b.

Thus, the noise components caused by the driving signals can be eliminated from the detection signals transmitted in the detecting wiring patterns 34a and 34b. As a result, the correct angular velocity can be obtained on the basis of such detection signals.

There is a demand for a reduction in the size of the vibrating gyroscope 1. However, in the configuration shown in FIG. 7, the vibrating sensor device 31 and the signal processing circuit 32 must be disposed in the same plane of the substrate 30. Accordingly, a large space is required for the substrate 30, and thus it is difficult to reduce the size of the substrate 30. As a consequence, the overall size of the vibrating gyroscope 1 cannot be reduced.

Additionally, in the configuration shown in FIG. 7, the compensation wiring pattern 35 is provided to compensate for noise components contained in the detection signal transmitted in the second detecting wiring pattern 34b. It is thus necessary to reserve space for the compensation wiring pattern 35. This hampers efforts to reduce the size of the substrate 30, making it difficult to miniaturize the overall vibrating gyroscope 1.

SUMMARY OF THE INVENTION

Accordingly, in order to solve the above-described problems, it is an object of the present invention to provide a compact vibrating gyroscope without impairing the accuracy in determining the angular velocity.

In order to achieve the above object, according to the present invention, there is provided a vibrating gyroscope including a vibrating sensor device provided with a vibrator. A signal processing circuit is connected to the vibrating sensor device, and generates a driving signal for driving the vibrator and supplying the driving signal to the vibrating sensor device, and processes a detection signal generated on the basis of a vibration of the vibrator caused by a Coriolis force. The vibrating sensor device is disposed on one of an obverse surface and a reverse surface of a substrate, and the signal processing circuit is disposed on the other surface of the substrate. The vibrating sensor device and the signal processing circuit are connected via a through-hole.

With this arrangement, the substrate can be considerably reduced compared to a conventional vibrating gyroscope in which the vibrating sensor device and the signal processing circuit are disposed in the same plane of the substrate.

In the aforementioned vibrating gyroscope, the signal processing circuit may be an IC device. With this arrangement, the vibrating gyroscope can further be miniaturized. The manufacturing process of assembling the vibrating gyroscope can also be simplified.

The vibrating sensor device and the signal processing circuit may face each other with the substrate therebetween. The center position of the vibrating sensor device may substantially coincide with the center position of the signal processing circuit.

With this configuration, the vibrating gyroscope can be considerably reduced compared to a conventional vibrating gyroscope in which the vibrating sensor device and the signal processing circuit are disposed far away from each other.

In the aforementioned vibrating gyroscope, a first detecting wiring pattern and a second detecting wiring pattern, which form a pair, may extend in opposite directions from the vibrating sensor device on the substrate. A first driving wiring pattern and a second driving wiring pattern for respectively allowing a first driving signal and a second driving signal, which are 180 degrees out of phase with each other, to pass therethrough may extend from the vibrating sensor device on the substrate. The first and second detecting wiring patterns and the first and second driving wiring patterns may be disposed so that a value obtained by multiplying a capacitance between the first detecting wiring pattern and the first driving wiring pattern with a capacitance between the second detecting wiring pattern and the second driving wiring pattern becomes substantially equal to a value obtained by multiplying a capacitance between the first detecting wiring pattern and the second driving wiring pattern with a capacitance between the second detecting wiring pattern and the first driving wiring pattern.

It is thus possible to eliminate the need for a wiring pattern to compensate for noise separately from the regular wiring patterns. The size of the vibrating gyroscope can further be reduced.

The first and second driving wiring patterns may extend from the vibrating sensor device in opposite directions along a line passing through the center of the vibrating sensor device. The first and second detecting wiring patterns may be disposed substantially orthogonal to an extending direction of the first and second driving wiring patterns along a line passing through the center of the vibrating sensor device.

A capacitance between the first detecting wiring pattern and the first driving wiring pattern, a capacitance between the second detecting wiring pattern and the second driving wiring pattern, a capacitance between the first detecting wiring pattern and the second driving wiring pattern, and a capacitance between the second detecting wiring pattern and the first driving wiring pattern may be substantially equal to each other.

With this arrangement, noise components caused by the driving signals contained in the detection signals can be removed with higher precision.

DESCRIPTION OF THE PREFERRED EMBODIMENTS

Figure 1A:
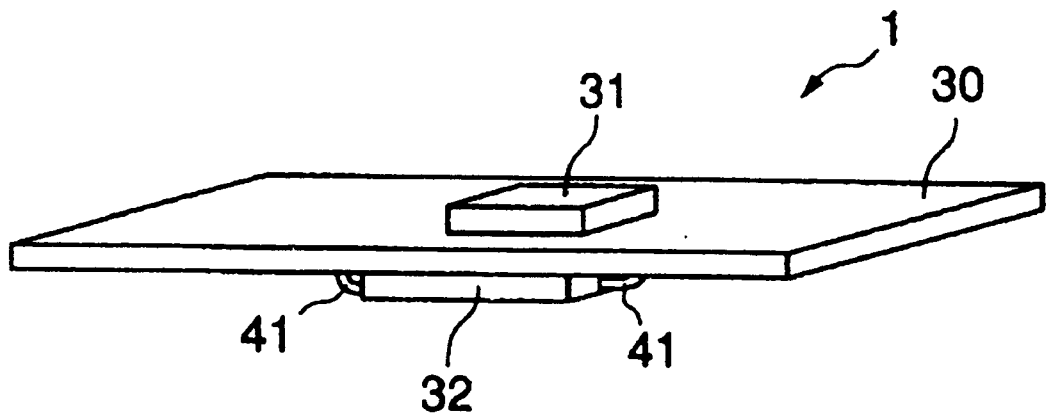
FIGS. 1A and 1B illustrate a vibrating gyroscope according to a first embodiment of the present invention.
Figure 1B:
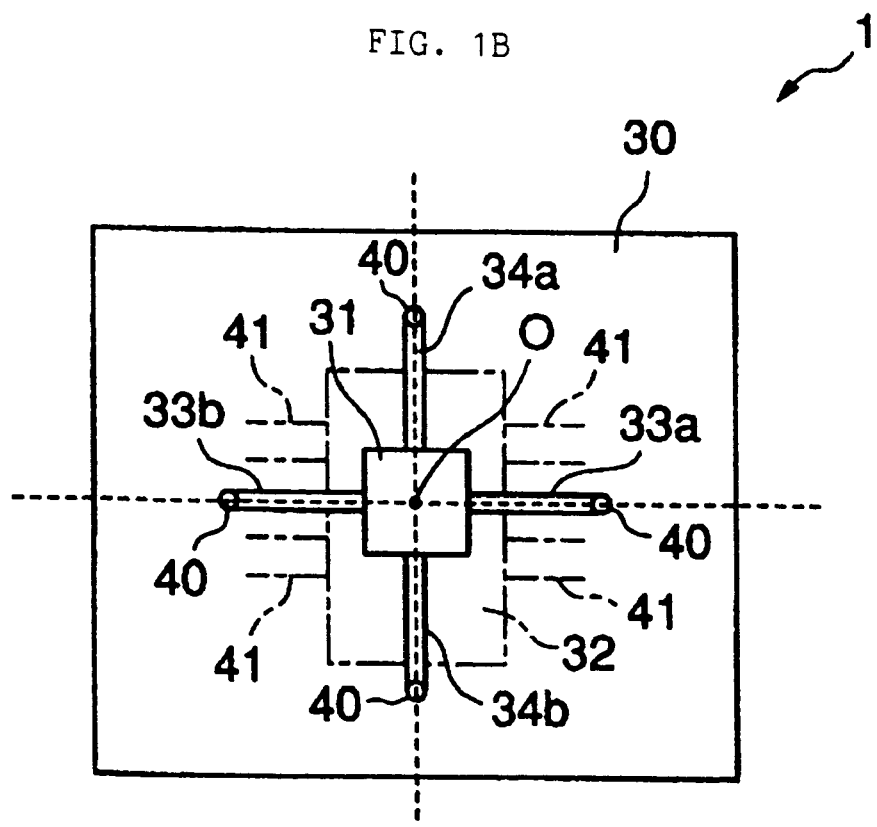

FIG. 1A is a perspective view schematically illustrating a vibrating gyroscope according to a first embodiment of the present invention. FIG. 1B is a top view schematically illustrating the vibrating gyroscope shown in FIG. 1A. In the first embodiment, the same elements as those of the above-described conventional vibrating gyroscope are designated with like reference numerals, and an explanation thereof will thus be omitted.

In the first embodiment, in order to reduce the size of the vibrating gyroscope 1, the arrangement of the vibrating sensor device 31 and the signal processing circuit 32, and the arrangement of the driving wiring patterns 33a and 33b and the detecting wiring patterns 34a and 34b are specified. The configuration of the other components is similar to that of the conventional vibrating gyroscope.

More specifically, in the first embodiment, as shown in FIGS. 1A and 1B, the vibrating sensor device 31 is disposed on an obverse or reverse surface (on the obverse surface in the embodiment shown in FIG. 1) of the substrate 30. The signal processing circuit 32 is disposed on the other surface (on the reverse surface in the embodiment shown in FIG. 1) of the substrate 30. In the first embodiment, the signal processing circuit 32 is formed of an IC device. The IC device of the signal processing circuit 32 and the vibrating sensor device 31 face each other with their centers aligned.

On the top surface of the substrate 30, as shown in FIG. 1B, the first driving wiring pattern 33a and the second driving wiring pattern 33b extend from the vibrating sensor device 31 in opposite directions along the same line passing through the center point O of the vibrating sensor device 31. On the top surface of the substrate 30, the first detecting wiring pattern 34a and the second detecting wiring pattern 34b also extend from the vibrating sensor device 31 in opposite directions so that they are orthogonal to the first and second driving wiring patterns 33a and 33b along the same line passing through the center point O of the vibrating sensor device 31. In other words, the first and second driving wiring patterns 33a and 33b are formed symmetrically to each other with respect to the first and second detecting wiring patterns 34a and 34b.

In the first embodiment, the length and the thickness of the first driving wiring pattern 33a are substantially equal to those of the second driving wiring pattern 33b. The length and the thickness of the first detecting wiring pattern 34a are also substantially equal to those of the second detecting wiring pattern 34b. In the first embodiment, therefore, the capacitance C11 between the first detecting wiring pattern 34a and the first driving wiring pattern 33a, the capacitance C21 between the second detecting wiring pattern 34b and the first driving wiring pattern 33a, the capacitance C22 between the second detecting wiring pattern 34b and the second driving wiring pattern 33b, and the capacitance C12 between the first detecting wiring pattern 34a and the second driving wiring pattern 33b are substantially equal to each other (C11=C21=C22=C12)

A through-hole 40 is formed on the substrate 30, as shown in FIG. 1B, at each of the forward-facing ends of the wiring patterns 33a, 33b, 34a, and 34b such that they are away from the center of the substrate 30. The vibrating sensor device 31 and the signal processing circuit 32 are connected to each other via the wiring patterns 33a, 33b, 34a, and 34b, the through-holes 40, and electrically connecting claw portions 41 provided for the IC device of the signal processing circuit 32.

According to the first embodiment, the vibrating sensor device 31 is disposed on an obverse or reverse surface of the substrate 30, and the signal processing circuit 32 is disposed on the other surface of the substrate 30. Accordingly, the vibrating sensor device 31 and the signal processing circuit 32 face each other via the substrate 30. Thus, the size of the vibrating gyroscope 1 can be considerably reduced compared to a conventional vibrating gyroscope in which the vibrating sensor device 31 and the signal processing circuit 32 are disposed in the same plane of the substrate 30.

According to the arrangement of the first embodiment, the first detecting wiring pattern 34a and the second detecting wiring pattern 34b can also extend from the vibrating sensor device 31 in opposite directions. Thus, the wiring patterns 33a, 33b, 34a, and 34b can be arranged so that the capacitances C11, C21, C22, and C12 are substantially equal to each other.

According to the arrangement of the wiring patterns 33a, 33b, 34a, and 34b, noise components caused by the driving signals can be eliminated from the detection signals transmitted in the first and second detecting wiring patterns 34a and 34b without the need for providing the compensation wiring pattern 35. That is, each of the detection signals transmitted in the first and second detecting wiring patterns 34a and 34b is influenced substantially equally by the first driving signal transmitted in the first driving wiring pattern 33a and the second driving signal transmitted in the second driving wiring pattern 33b.

As stated above, the first and second driving signals have substantially the same amplitude and are 180 degrees out of phase with each other. Thus, the noise components caused by the first driving signal contained in the first detection signal of the first detecting wiring pattern 34a are offset by those caused by the second driving signal contained in the second detection signal of the second detecting wiring pattern 34b.

In this manner, the noise components can be eliminated from the detection signals transmitted in the first and second detecting wiring patterns 34a and 34b without the need for the compensation wiring pattern 35. Thus, the vibrating gyroscope 1 can be miniaturized while maintaining the ability to accurately determine the angular velocity.

Figure 2:
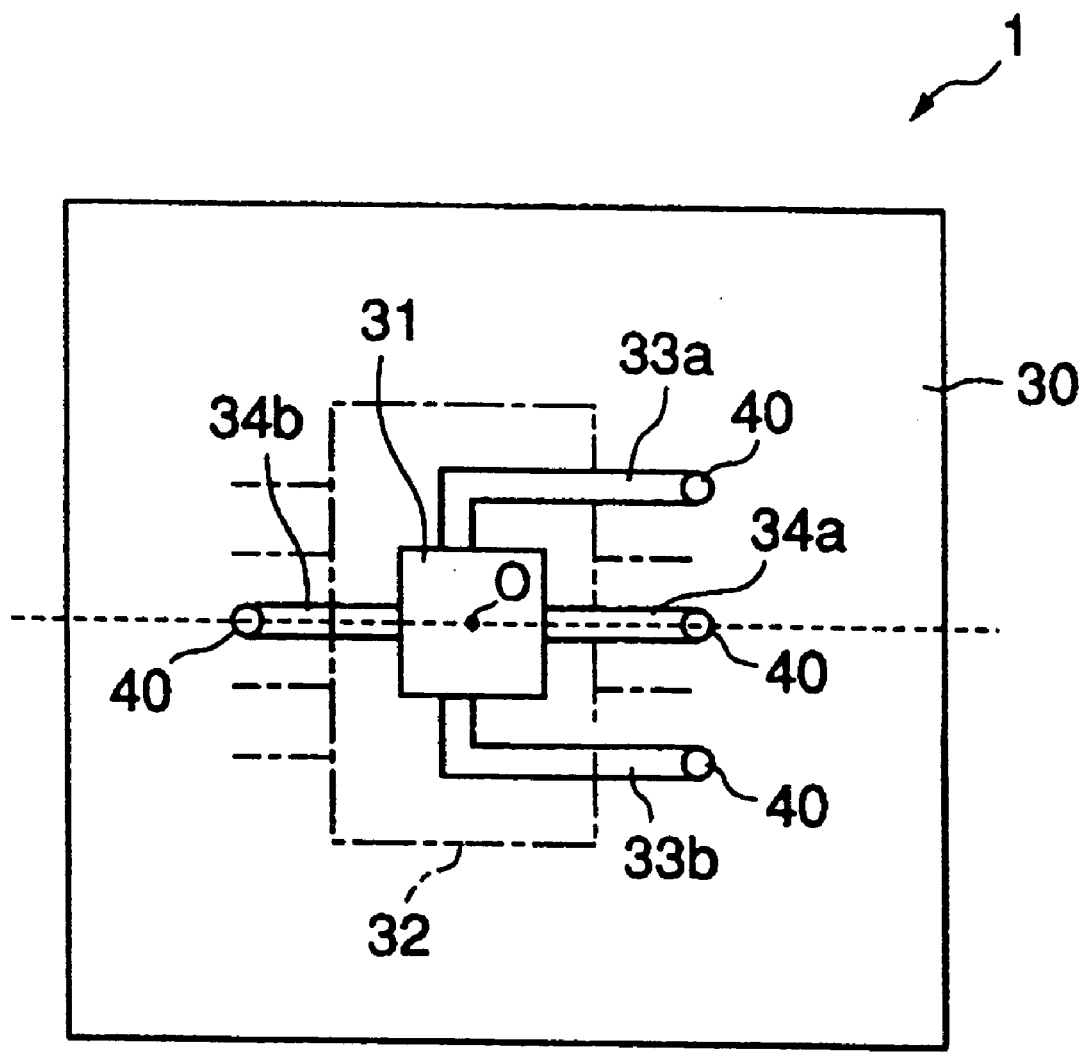
FIG. 2 illustrates a vibrating gyroscope according to a second embodiment of the present invention.

A second embodiment of the present invention is discussed below. The second embodiment differs from the first embodiment, as shown in FIG. 2, in the arrangement of the wiring patterns 33a, 33b, 34a, and 34b. The configuration of the other factors is similar to that of the first embodiment. The same elements as those of the first embodiment are indicated by like reference numerals, and an explanation thereof will thus be omitted.

In the first embodiment, the wiring patterns 33a, 33b, 34a, and 34b are disposed so that the capacitances C11, C21, C22, and C12 become substantially equal to each other (C11=C21=C22=C12). Alternatively, the wiring patterns 33a, 33b, 34a, and 34b may be disposed so that the value obtained by multiplying the capacitance C11 with the capacitance C22 becomes equal to that obtained by multiplying the capacitance C21 with the capacitance C12 (C11·C22=C21·C12). Then, by the differential operation of the differential amplifier 25 of the signal processing circuit 32, the noise components caused by the driving signals contained in the detection signals of the first and second detection wiring patterns 34a and 34b can be removed.

Accordingly, in the second embodiment, the wiring patterns 33a, 33b, 34a, and 34b are arranged so as to satisfy the condition C11·C22=C21·C12. More specifically, the first and second detecting wiring patterns 34a and 34b extend, as shown in FIG. 2, from the vibrating sensor device 31 in opposite directions along the same line passing through the center point O of the vibrating sensor device 31. The first and second driving wiring patterns 33a and 33b are disposed away from each other with the first detecting wiring pattern 34a therebetween.

In the second embodiment, in order to satisfy the condition C11·C22=C21·C12, the first and second driving wiring patterns 33a and 33b are disposed relative to the first detecting wiring pattern 34a so that the space between the first detecting wiring pattern 34a and the first driving wiring pattern 33a is substantially equal to the space between the first detecting wiring pattern 34a and the second driving wiring pattern 33b. In other words, the first and second driving wiring patterns 33a and 33b are disposed symmetrically to each other with respect to the first and second detecting wiring patterns 34a and 34b.

With this arrangement, the capacitance C11 between the first detecting wiring pattern 34a and the first driving wiring pattern 33a becomes substantially equal to the capacitance C12 between the first detecting wiring pattern 34a and the second driving wiring pattern 33b. Also, the capacitance C21 between the second detecting wiring pattern 34b and the first driving wiring pattern 33a becomes substantially equal to the capacitance C22 between the second detecting wiring pattern 34b and the second driving wiring pattern 33b. That is, the condition C11·C22=C21·C12 can be satisfied.

According to the second embodiment, since the above-described condition is satisfied, the phase and amplitude of the noise components caused by the driving signals contained in the detection signal of the first detecting wiring pattern 34a are substantially the same as the noise components caused by the driving signals contained in the detection signal of the second detecting wiring pattern 34b. Accordingly, by the differential operation of the differential amplifier 25 of the signal processing circuit 32, the noise components caused by the driving signals contained in the detection signal input into the signal processing circuit 32 via the first detecting wiring pattern 34a are offset by those contained in the detection signal input into the signal processing circuit 32 via the second detecting wiring pattern 34b. As a result, the angular velocity signal without noise components can be output from the differential amplifier 25, and the angular velocity can thus be correctly determined based on the angular velocity signal. It is thus possible to provide a compact and high-precision vibrating gyroscope 1.

The present invention is not restricted to the foregoing embodiments, and various modifications and changes may be made. For example, it is not essential that the center position of the vibrating sensor device 31 coincide with that of the signal processing circuit 32. Additionally, although in the above-described embodiments the signal processing circuit 32 is formed of an IC device, it may be directly formed on the substrate 30.

Figure 3A:
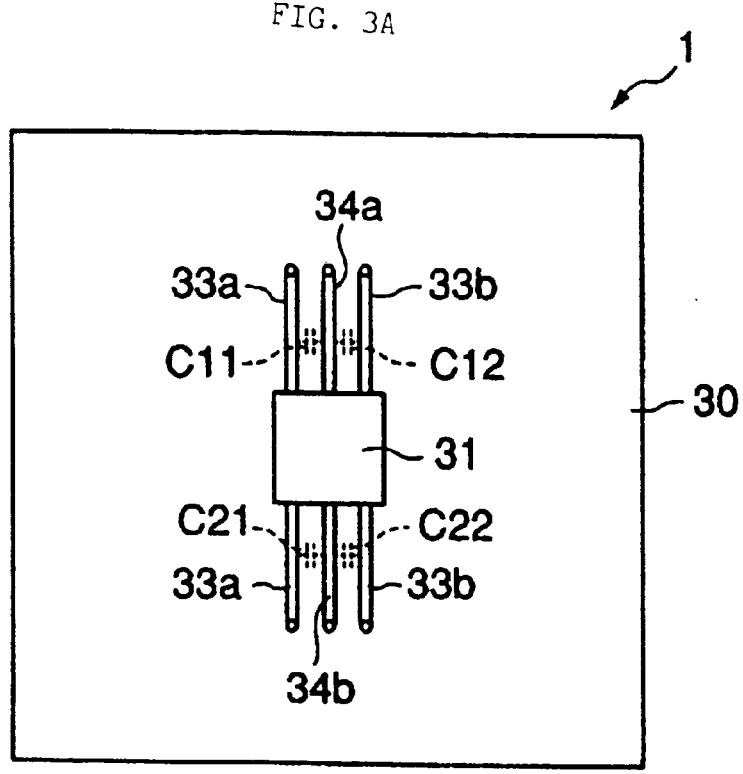
FIGS. 3A and 3B illustrate examples of modifications made to the present invention.

In the foregoing embodiments, only one first driving wiring pattern 33a and one second driving wiring pattern 33b are provided, a plurality of first driving pattern patterns 33a or/and a plurality of second driving wiring patterns 33b may be provided. One example of such a modification is shown in FIG. 3A. In FIG. 3A, the first and second detecting wiring patterns 34a and 34b extend from the vibrating sensor device 31 in opposite directions. One pair of the first and second driving wiring patterns 33a and 33b are disposed from the vibrating sensor device 31 with the first detecting wiring pattern 34a therebetween. Another pair of the first and second driving wiring patterns 33a and 33b are disposed from the vibrating sensor device 31 with the second detecting wiring pattern 34b therebetween.

In the modification shown in FIG. 3A, as in the foregoing embodiments, the space between each of the wiring patterns 33a, 33b, 34a, and 34b, and the length and the thickness thereof are set so that the value obtained by multiplying the capacitance C11 between the first detecting wiring pattern 34a and the adjacent first driving wiring pattern 33a with the capacitance C22 between the second detecting wiring pattern 34b and the adjacent second driving wiring pattern 33b becomes substantially the same as that obtained by multiplying the capacitance C12 between the first detecting wiring pattern 34a and the adjacent second driving wiring pattern 33b with the capacitance C21 between the second detecting wiring pattern 34b and the adjacent first driving wiring pattern 33a (C11·C22=C21·C12). More preferably, the wiring patterns 33a, 33b, 34a, and 34b are formed and disposed so as to satisfy the condition C11=C12=C21=C22.

The first driving signals transmitted in the plurality of first driving wiring patterns 33a shown in FIG. 3A have the same phase and amplitude. Similarly, the second driving signals transmitted in the plurality of second driving wiring patterns 33b have the same amplitude as the first driving signals, and are 180 degrees out of phase with the first driving signals.

In the example shown in FIG. 3A, as in the above-described embodiments, the noise components caused by the driving signals contained in the detection signals of the first and second detecting wiring patterns 34a and 34b can be removed. Thus, the size of the vibrating gyroscope 1 can be reduced while maintaining the ability to accurately to determine the angular velocity.

Figure 3B:
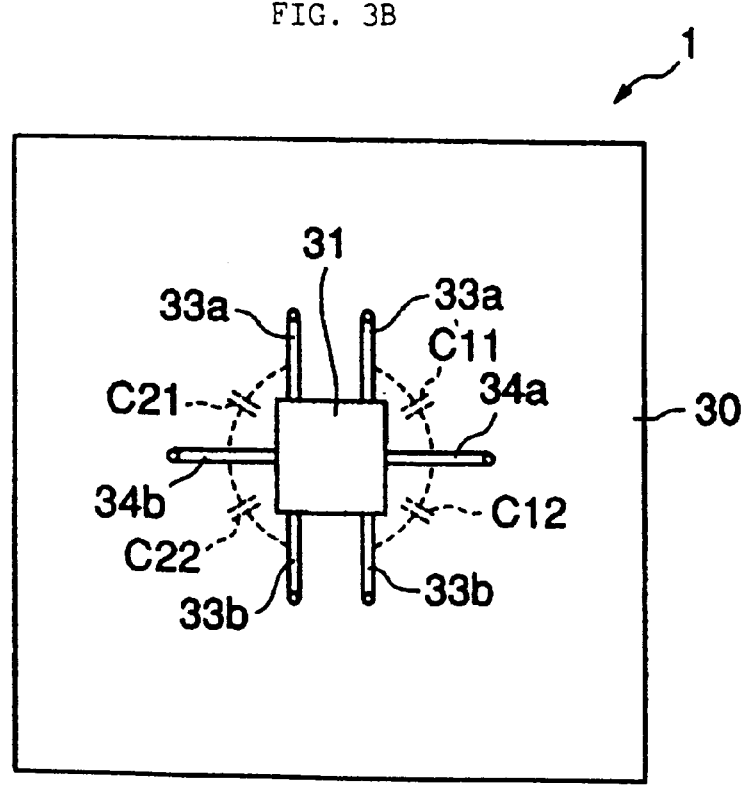
Figure 4:
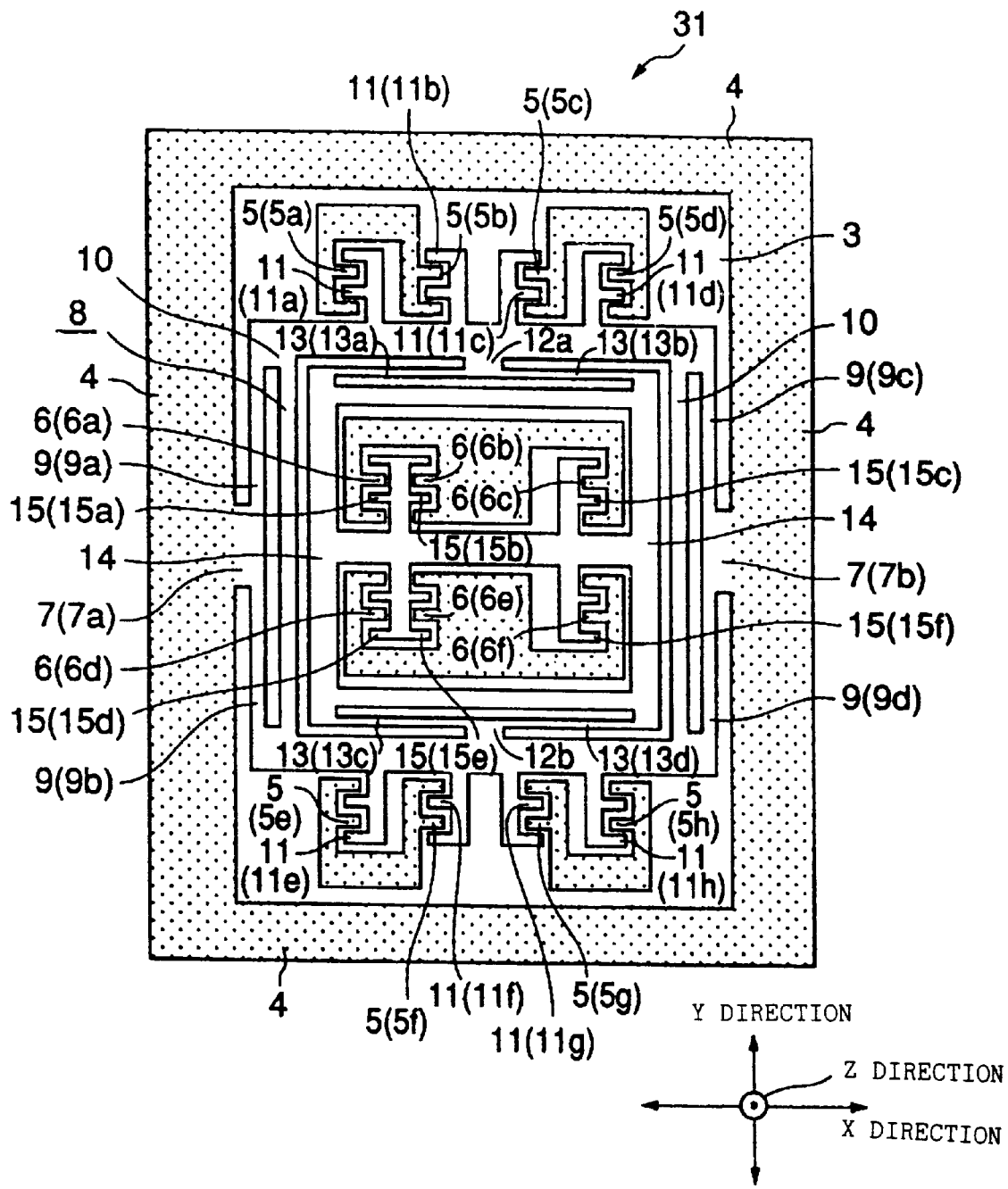
FIG. 4 illustrates an example of a vibrating sensor device used in a conventional vibrating gyroscope.
Figure 5:
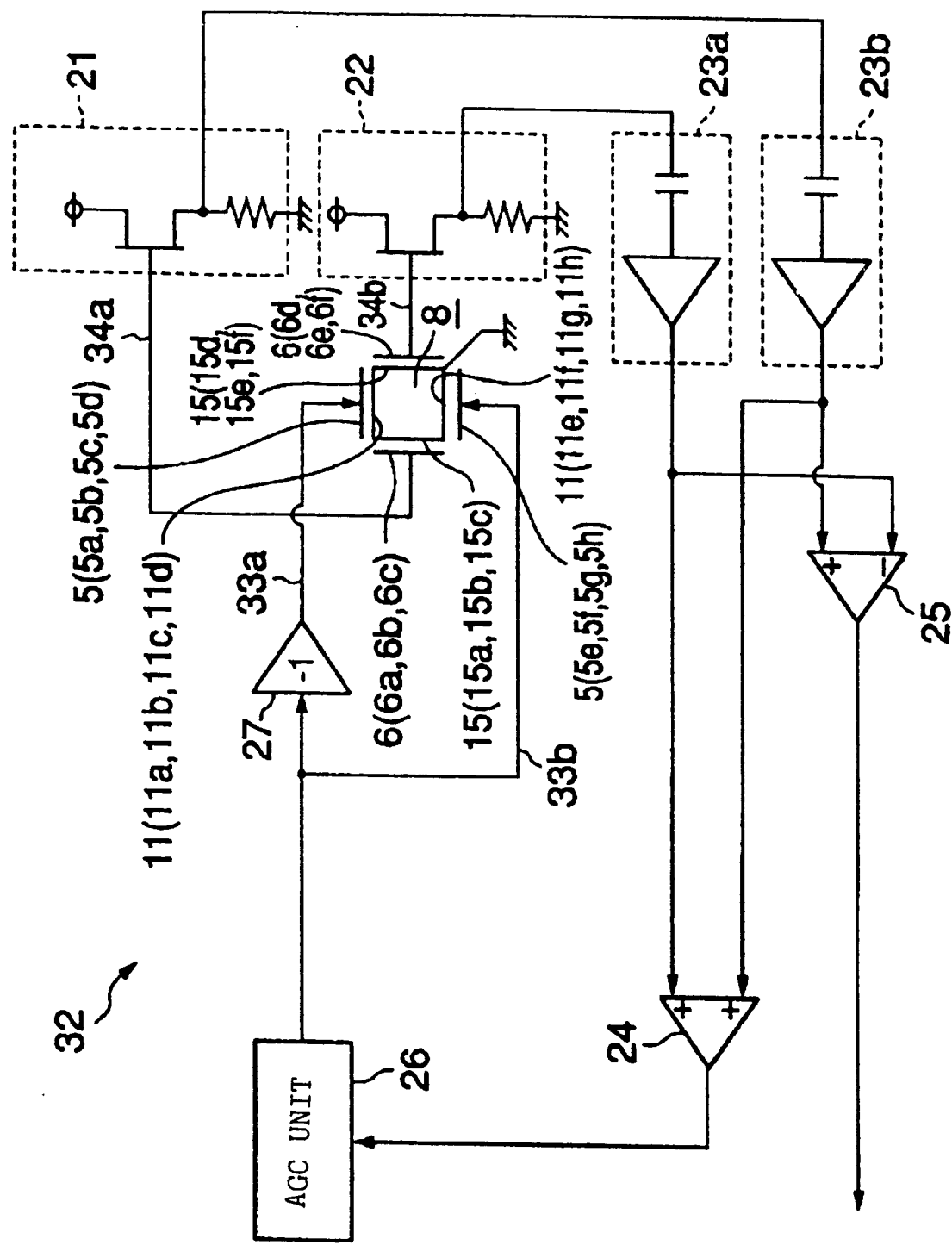
FIG. 5 illustrates an example of a signal processing circuit used in a conventional vibrating gyroscope.
Figure 6:
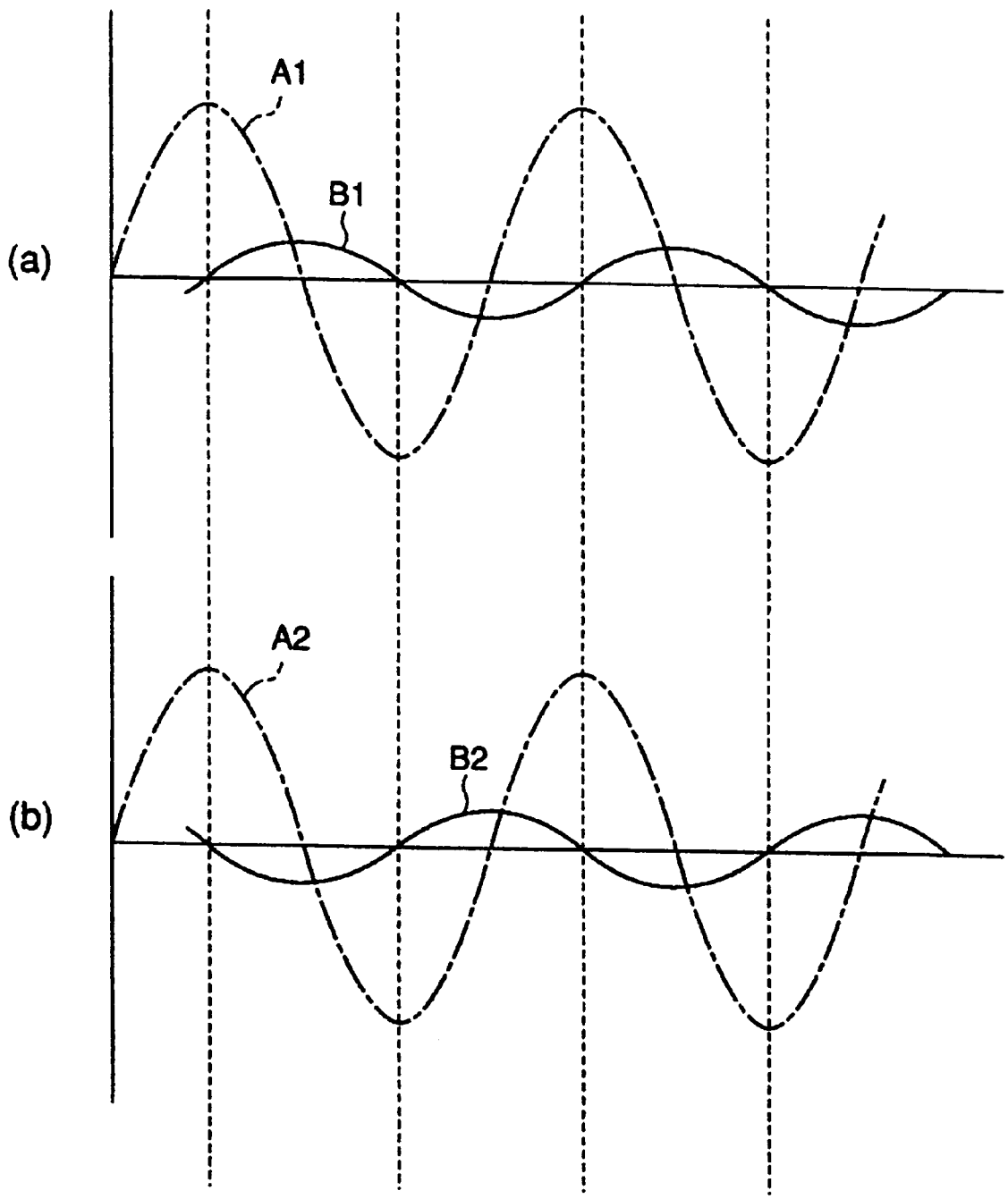
FIG. 6 is a waveform diagram illustrating detection signals.
Figure 7:
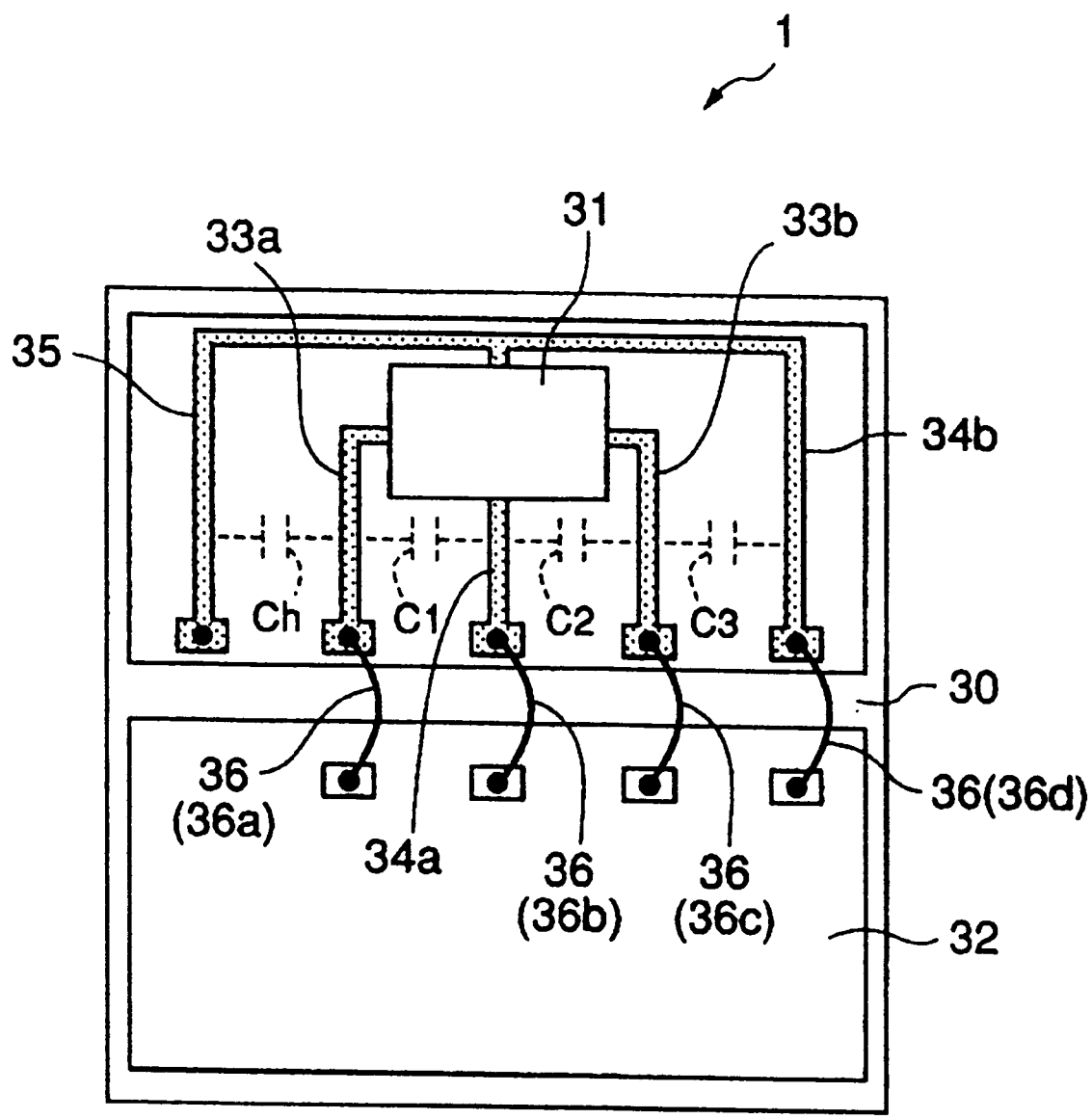
FIG. 7 illustrates an example of a conventional vibrating gyroscope.

The vibrating gyroscope 1 may be modified as that shown in FIG. 3B. In this example, the first and second detecting wiring patterns 34a and 34b horizontally extend from the vibrating sensor device 31 in opposite directions. Two first driving wiring patterns 33a extend upward from the vibrating sensor device 31 as shown in FIG. 3B, while two second driving wiring patterns 33b extend downward from the vibrating sensor device 33b as shown in FIG. 3B.

In the example shown in FIG. 3B, as in the foregoing embodiments, the space between each of the wiring patterns 33a, 33b, 34a, and 34b, and the length and the thickness thereof are set so that the value obtained by multiplying the capacitance C11 with the capacitance C22 becomes substantially equal to the value obtained by multiplying the capacitance C12 with the capacitance C21.

In the example shown in FIG. 3B, as in the example shown in FIG. 3A, the first driving signals transmitted in the two first driving wiring patterns 33a have the same amplitude and phase. Likewise, the second driving signals transmitted in the two second driving wiring patterns 33b have the same amplitude as the first driving signals, and are 180 degrees out of phase with the first driving signals.

Accordingly, in the example shown in FIG. 3B, the noise components caused by the driving signals contained in the detection signals passing through the first and second detecting wiring patterns 34a and 34b can be eliminated. It is thus possible to miniaturize the vibrating gyroscope 1 while maintaining the ability to accurately determine the angular velocity.

What is claimed is:

1. A vibrating gyroscope comprising:

a vibrating sensor device including a vibrator; and a signal processing circuit connected to said vibrating sensor device, for generating a driving signal for driving said vibrator and supplying the driving signal to said vibrating sensor device, and for processing a detection signal generated on the basis of a vibration of said vibrator caused by a Coriolis force, wherein said vibrating sensor device is disposed on one of an obverse surface and a reverse surface of a substrate, and said signal processing circuit is disposed on the other surface of said substrate, said vibrating sensor device and said signal processing circuit being connected via a through-hole.

2. A vibrating gyroscope according to claim 1, wherein said signal processing circuit comprises an integrated circuit device.

3. A vibrating gyroscope according to claim 1, wherein said vibrating sensor device and said signal processing circuit face each other with said substrate therebetween.

4. A vibrating gyroscope according to claim 3, wherein the center position of said vibrating sensor device substantially coincides with the center position of said signal processing circuit.

5. A vibrating gyroscope according to claim 1, wherein:

a first detecting wiring pattern and a second detecting wiring pattern, which form a pair, extend in opposite directions from said vibrating sensor device on said substrate, and a first driving wiring pattern and a second driving wiring pattern for respectively allowing a first driving signal and a second driving signal, which are 180 degrees out of phase with each other, to pass therethrough extend from said vibrating sensor device on said substrate; and said first and second detecting wiring patterns and said first and second driving wiring patterns are disposed so that a value obtained by multiplying a capacitance between said first detecting wiring pattern and said first driving wiring pattern with a capacitance between said second detecting wiring pattern and said second driving wiring pattern is substantially equal to a value obtained by multiplying a capacitance between said first detecting wiring pattern and said second driving wiring pattern with a capacitance between said second detecting wiring pattern and said first driving wiring pattern.

6. A vibrating gyroscope according to claim 5, wherein said first and second driving wiring patterns extend from said vibrating sensor device in opposite directions along a line passing through the center of said vibrating sensor device, and said first and second detecting wiring patterns are disposed substantially orthogonal to an extending direction of said first and second driving wiring patterns along a line passing through the center of said vibrating sensor device.

7. A vibrating gyroscope according to claim 5, wherein a capacitance between said first detecting wiring pattern and said first driving wiring pattern, a capacitance between said second detecting wiring pattern and said second driving wiring pattern, a capacitance between said first detecting wiring pattern and said second driving wiring pattern, and a capacitance between said second detecting wiring pattern and said first driving wiring pattern are substantially equal to each other.

* * * * *